March 30, 1954

L. R. HECKER ET AL 2,673,495

METHOD AND APPARATUS FOR MAKING BAGS

Filed March 13, 1946

Inventors
LEONARD R. HECKER
MURRAY P. CLARK.

By Ross C. Hurney

Attorney

March 30, 1954   L. R. HECKER ET AL   2,673,495
METHOD AND APPARATUS FOR MAKING BAGS
Filed March 13, 1946   10 Sheets-Sheet 2

Inventors
LEONARD R. HECKER
MURRAY P. CLARK
By Ross CHurrey
Attorney

March 30, 1954

L. R. HECKER ET AL 2,673,495

METHOD AND APPARATUS FOR MAKING BAGS

Filed March 13, 1946

INVENTORS
LEONARD R. HECKER.
BY MURRAY P. CLARK.

March 30, 1954 L. R. HECKER ET AL 2,673,495
METHOD AND APPARATUS FOR MAKING BAGS
Filed March 13, 1946 10 Sheets-Sheet 4

INVENTORS
LEONARD R. HECKER
BY MURRAY P. CLARK.

March 30, 1954 L. R. HECKER ET AL 2,673,495
METHOD AND APPARATUS FOR MAKING BAGS
Filed March 13, 1946 10 Sheets-Sheet 7

INVENTORS
LEONARD R. HECKER.
BY MURRAY P. CLARK.

March 30, 1954

L. R. HECKER ET AL 2,673,495

METHOD AND APPARATUS FOR MAKING BAGS

Filed March 13, 1946

INVENTORS
LEONARD R. HECKER.
BY MURRAY P. CLARK.

March 30, 1954
L. R. HECKER ET AL
2,673,495
METHOD AND APPARATUS FOR MAKING BAGS
Filed March 13, 1946
10 Sheets-Sheet 9
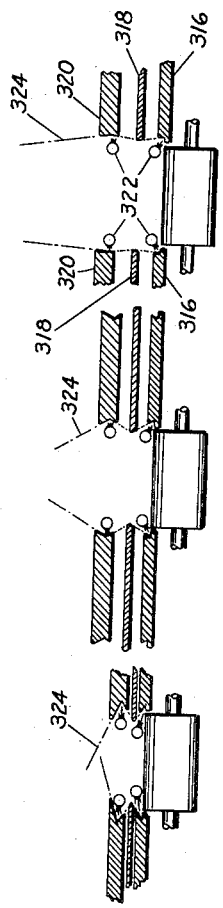
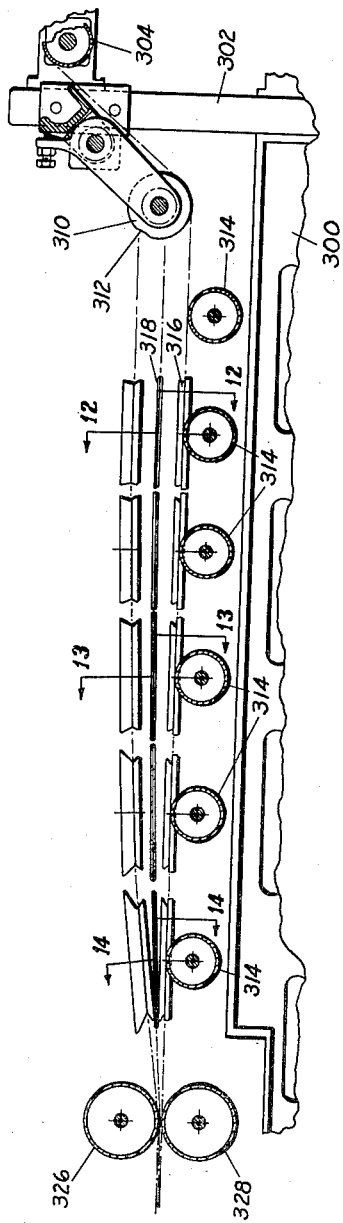
INVENTORS
LEONARD R. HECKER.
BY MURRAY P. CLARK.

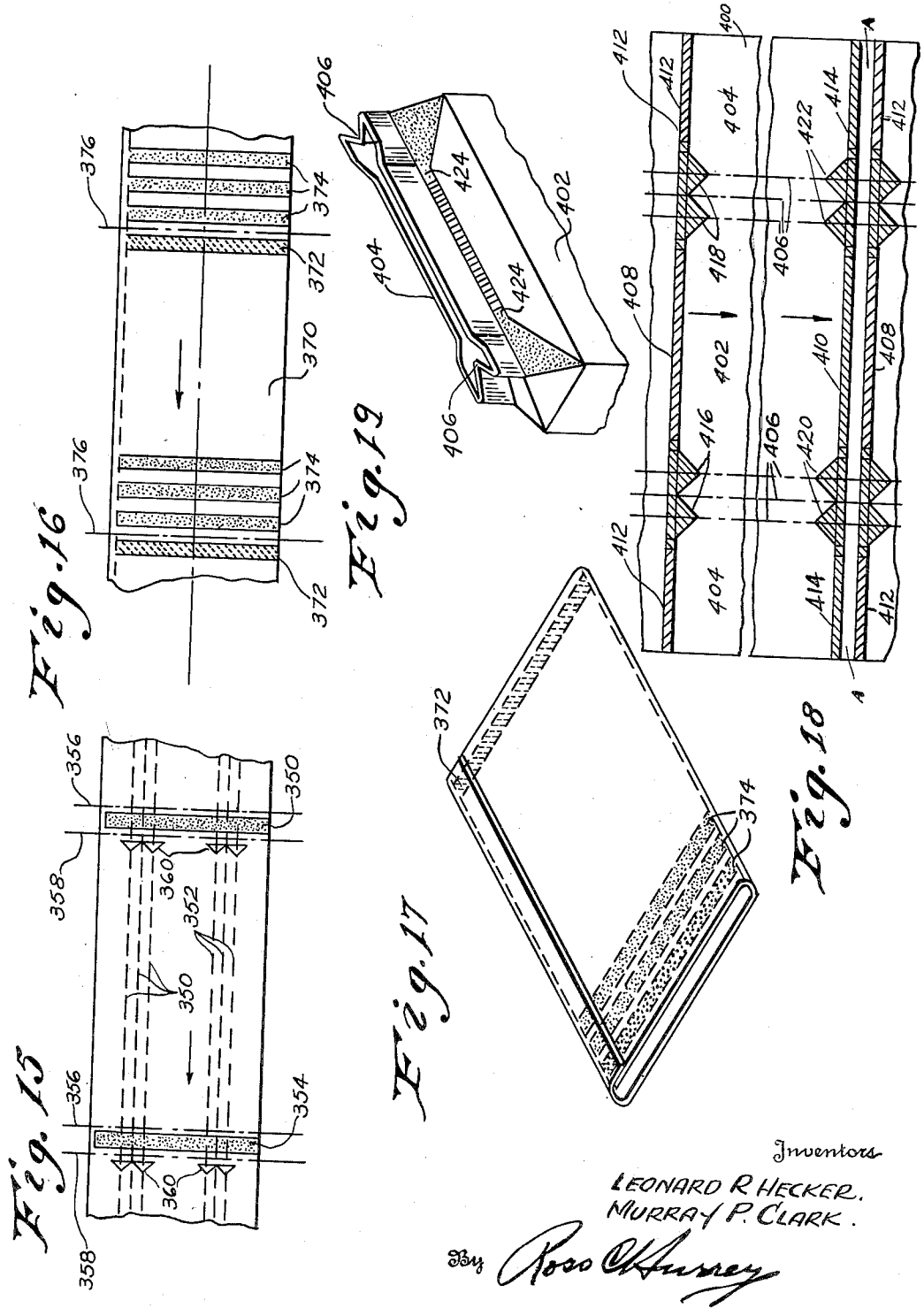

Patented Mar. 30, 1954

2,673,495

UNITED STATES PATENT OFFICE 2,673,495

METHOD AND APPARATUS FOR MAKING BAGS

Leonard R. Hecker, Havertown, and Murray P. Clark, Upper Darby, Pa., assignors, by mesne assignments, to Continental Can Company, Inc., New York, N. Y., a corporation of New York Application March 13, 1946, Serial No. 654,150

5 Claims. (Cl. 93—35)

It is an object of this invention to provide an improved method and apparatus for forming a continuous web into a tube and for severing consecutive lengths from the tube thus formed, as a part of the bag-making process.

It is a further object of this invention to provide a method and apparatus as aforesaid in which a tube is formed without contact between any solid object and the interior of the tube during the tubing operation.

It is a further object of this invention to provide a method and apparatus as aforesaid in which the frictional load on the web during the tubing operation is reduced to a minimum.

It is a further object of this invention to provide a method and apparatus as aforesaid in which predetermined patterns of wet adhesive may be applied to the inner surface of the tube prior to the tubing operation and the tubing operation may be carried out before such adhesive is dry.

It is a further object of this invention to provide certain improved bag constructions which are made possible by the method and apparatus aforesaid.

The above and other objects will be made clear from the following detailed description, taken in connection with the annexed drawings, in which.

Figure 4:
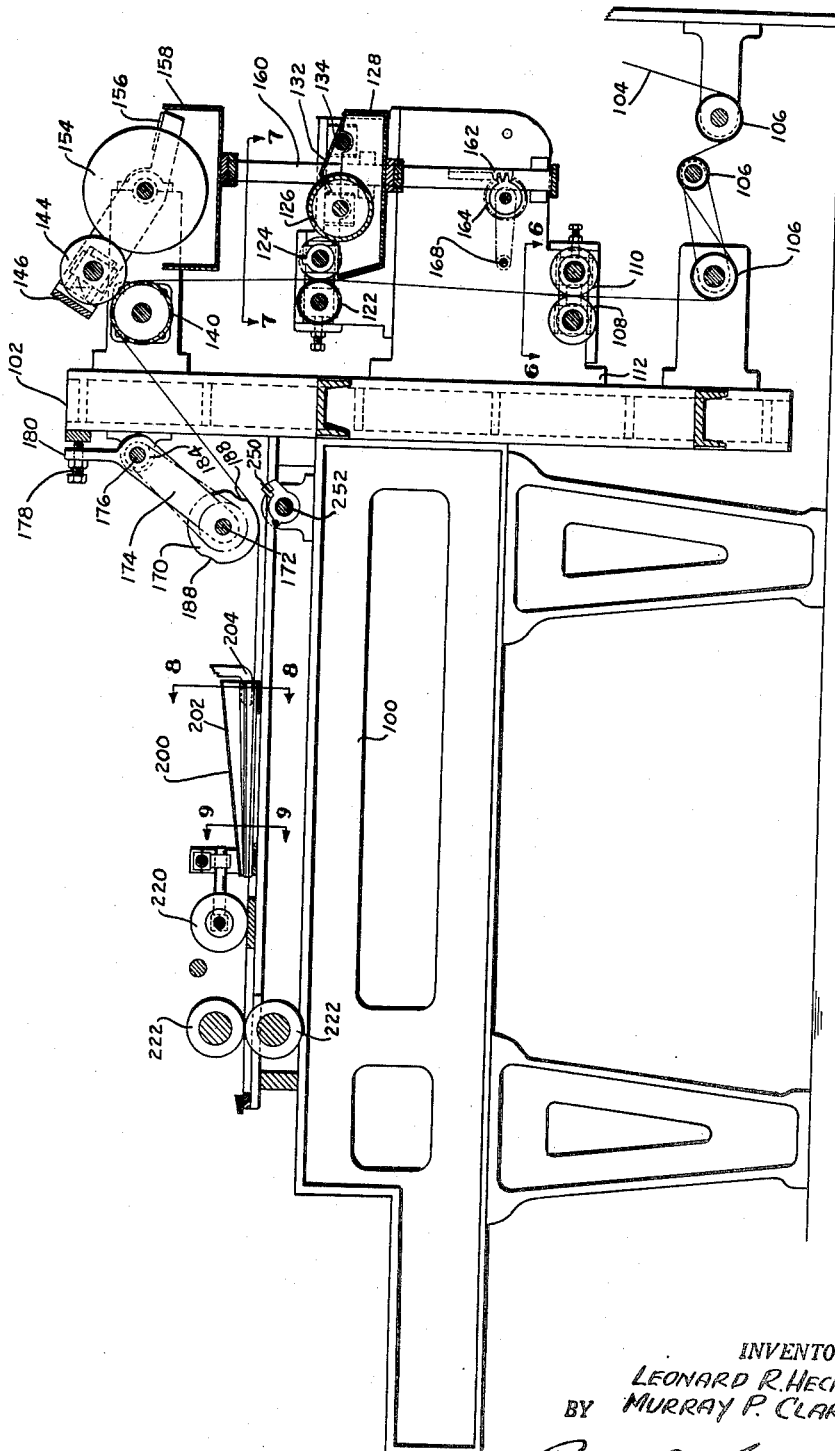
Fig. 4 is a side elevation of a second form of improved machine.
Figure 5:
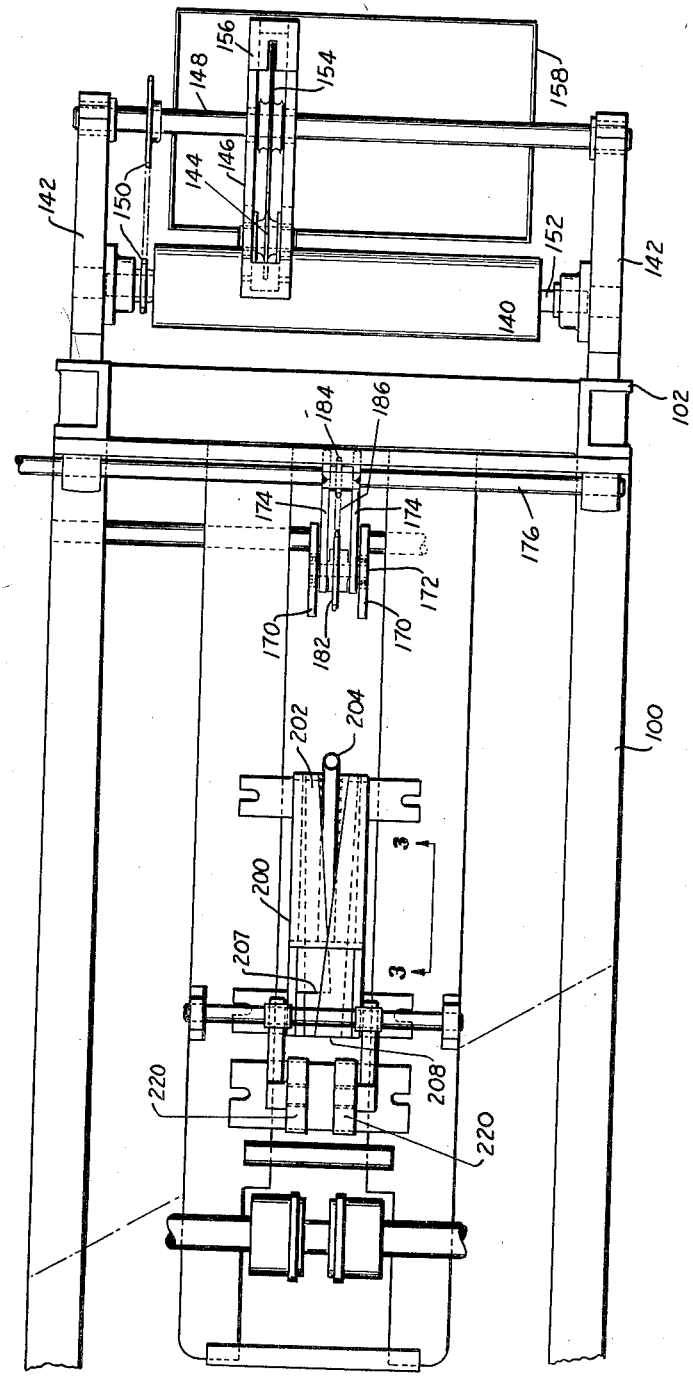
Fig. 5 is a plan view of the machine shown in Fig. 4.
Figure 6:
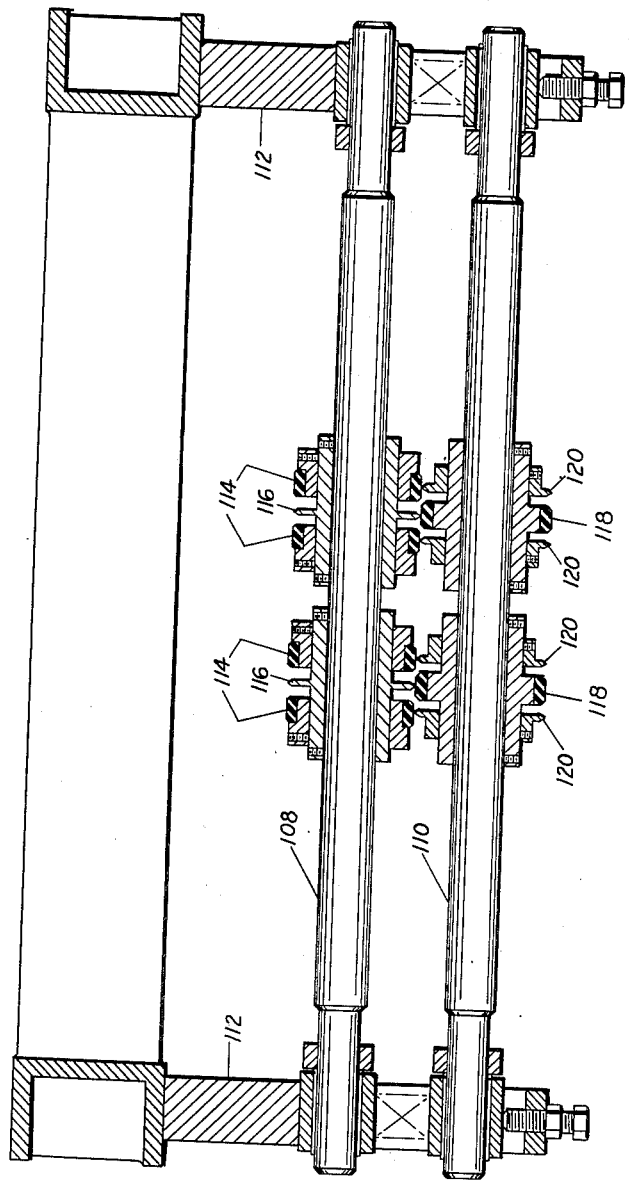
Figure 7:
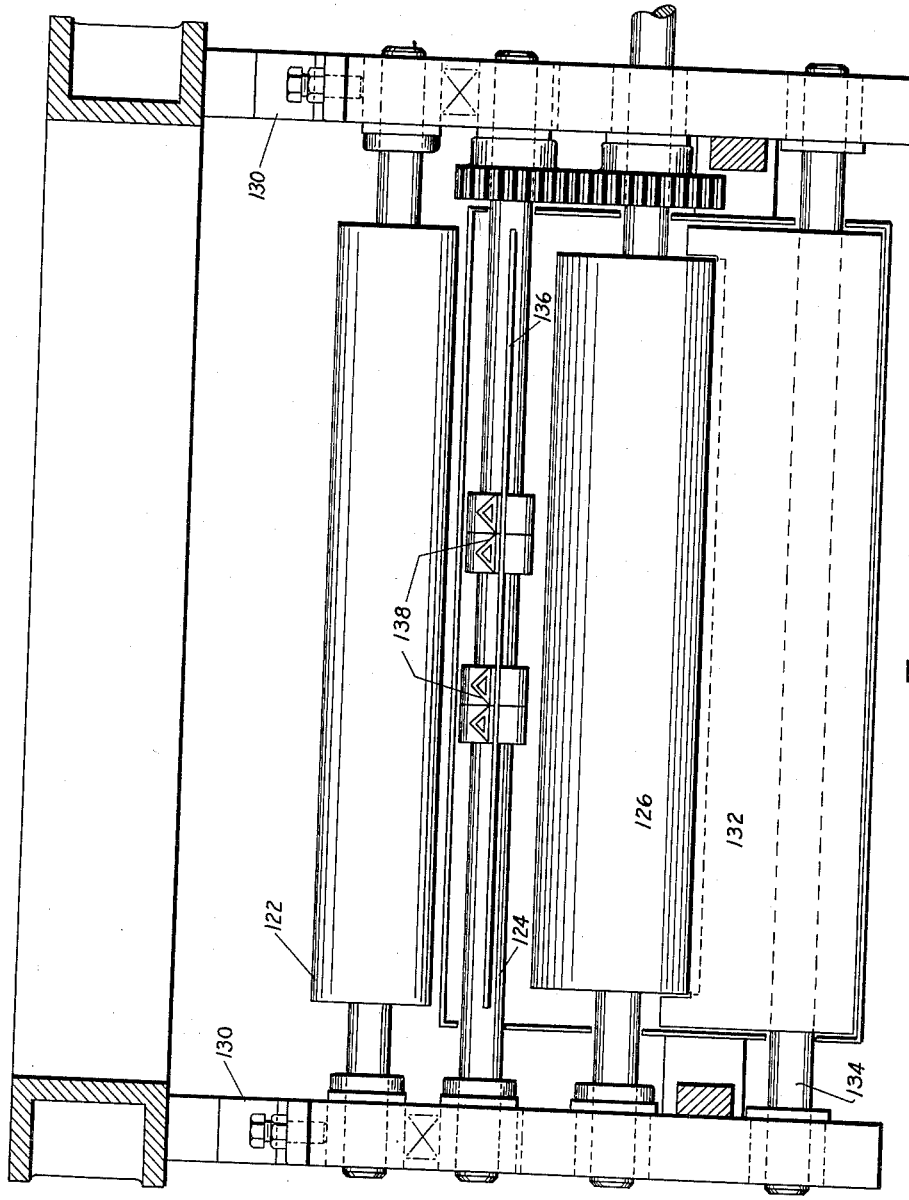
Figure 8:
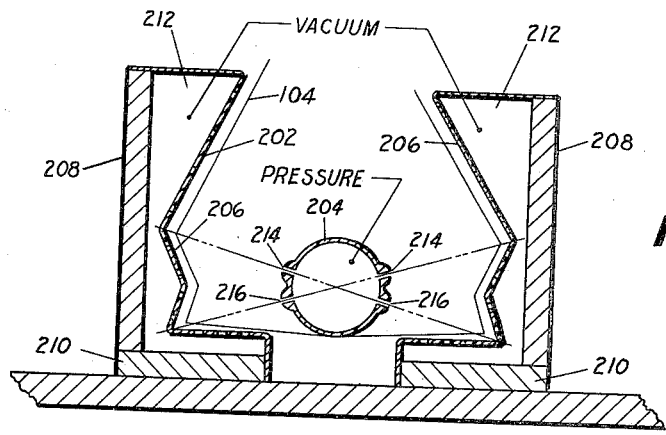
Figure 9:
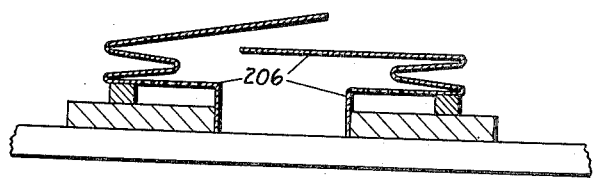
Figure 11:
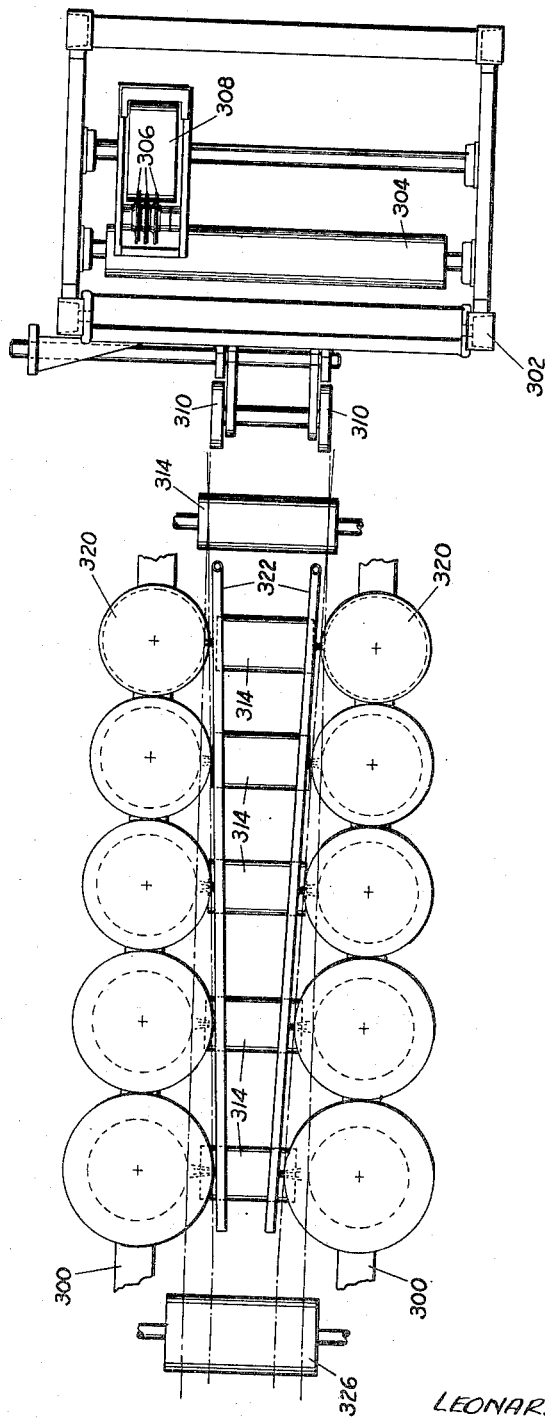

Fig. 6 is a section on the line 6—6 of Fig. 4;
Fig. 7 is a section on the line 7—7 of Fig. 4;
Fig. 8 is a section on the line 8—8 of Fig. 4;
Fig. 9 is a section on the line 9—9 of Fig. 4;
Fig. 10 is a side elevation of another form of machine;
Fig. 11 is a plan view corresponding to Fig. 9;
Fig. 12 is a section on the line 12—12 of Fig. 10;
Fig. 13 is a section on the line 13—13 of Fig. 10;
Fig. 14 is a section on the line 14—14 of Fig. 10;
Fig. 15 is a plan view of a web of paper illustrating the pattern which is applied by the mechanism illustrated in Fig. 7;
Fig. 16 is a view similar to Fig. 15 but illustrating a different pattern;
Fig. 17 is a perspective view of the bag formed from the web treated in accordance with Fig. 16;
Fig. 18 is a plan view of a web with still another pattern; and
Fig. 19 is a perspective view of the mouth of the bag treated in accordance with Fig. 18.

Figure 1:
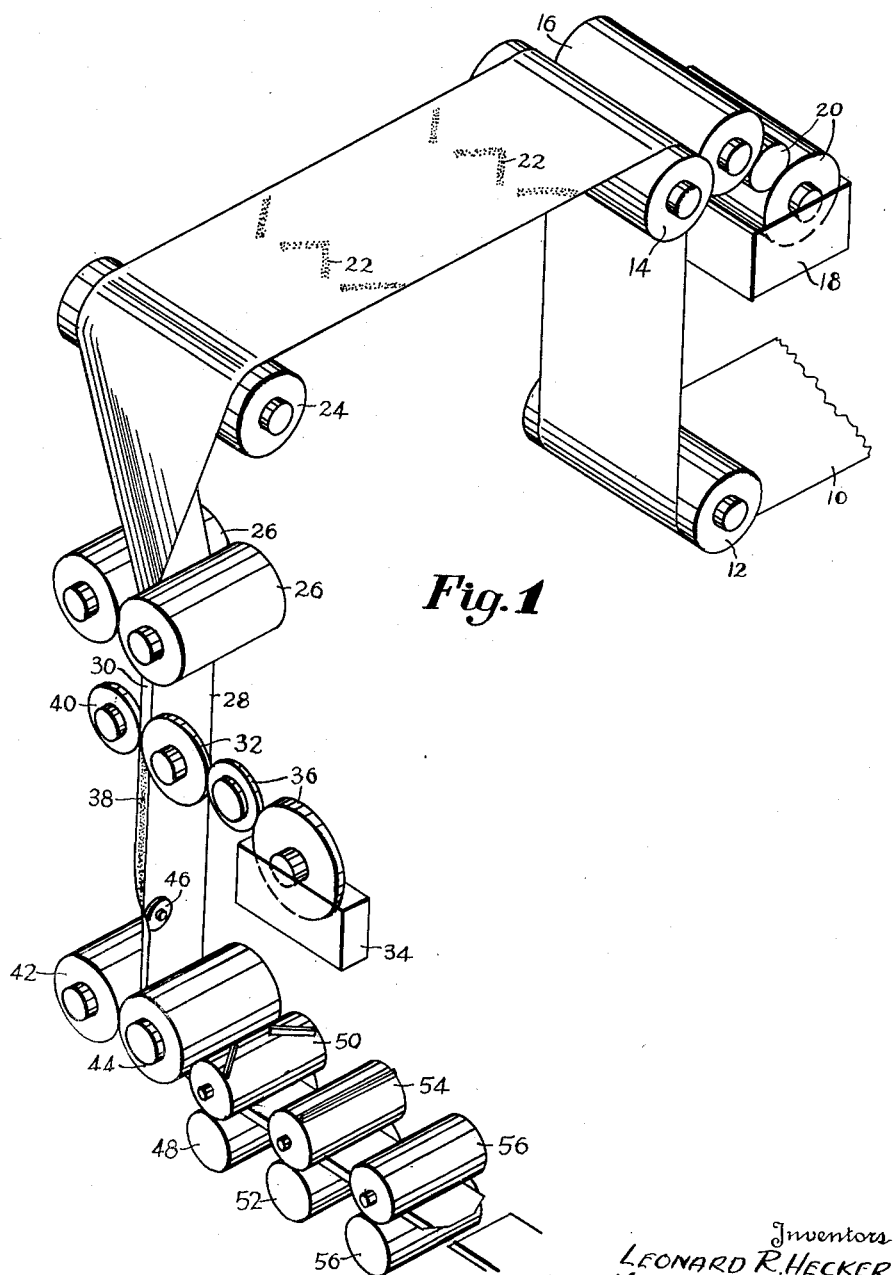
Fig. 1 is a schematic, perspective view illustrating one form of this invention.

Referring now to Fig. 1, there is shown a web 10 of sheet material which is fed over a tensioning roll 12, thence over a backing roll 14. A printing roll 16 presses the web 10 against the backing roll 14. The printing roll 16 receives adhesive in liquid form from a vat 18, by means of transfer rolls 20. The printing roll 16 may carry any suitable pattern and imprints this pattern upon the web 10. This pattern in the instant case is illustrated at 22. The web 10 then passes over a guide roll 24 and is folded upon itself to pass in folded condition between draw rolls 26.

The fold line 28, established by the draw rolls 26, is offset from the center line of the web sufficiently to produce a projecting margin 30. A wheel 32 receives adhesive from a vat 34 by means of transfer wheels 36 and applies a continuous stripe 38 of adhesive to the margin 30, which is supported against the wheel 32 by a backing wheel 40.

The folded web then passes between draw rolls 42 and 44, wrapping substantially a quarter turn around the roll 44. In threading the machine, the margin 30 is turned over to overlap the opposite margin of the web 10 before the tube is threaded between rolls 42 and 44. A guide wheel 46 is provided to prevent encroachment of the fold line of the margin 30 too far inwardly of the tube.

The tube is complete as it passes between the draw rolls 42 and 44. The tube then passes between a backing roll 48 and a cutter roll 50. The rolls 48 and 50 cooperate to make diagonal cuts in the tube adjacent each margin. The tube then passes between a backing roll 52 and a cutter roll 54, which coact to sever a bag length from the tube. The severed length is then withdrawn by draw rolls 56.

Figure 2:
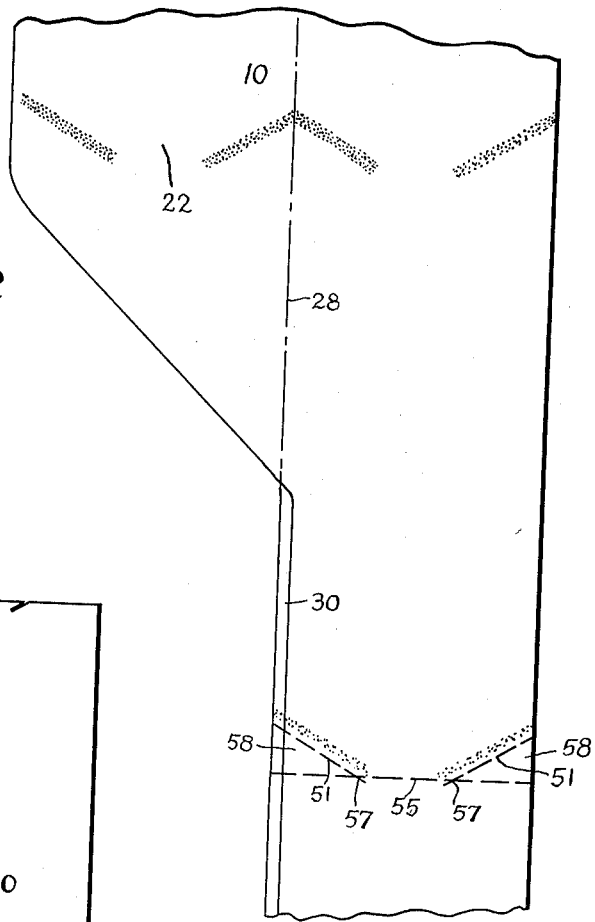
Fig. 2 is a diagrammatic view illustrating the treatment of the web in Fig. 1.
Figure 3:
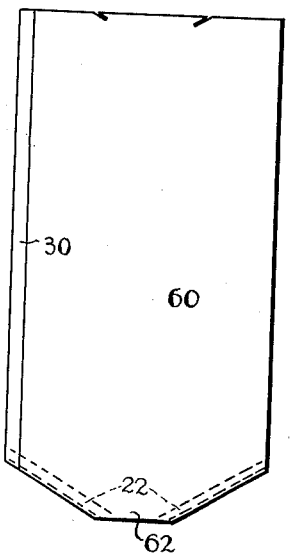
Fig. 3 is a plan view of the bag produced in accordance with Figs. 1 and 2.

The significance of the steps just described will be clarified by Figs. 2 and 3. Obviously the patterns 22 are correlated and synchronized with the cutter rolls 50 and 54. The cutter rolls 50 produce diagonal slits 51, which parallel the adhesive strips in the pattern 22. It will be noted that the effect of the pattern 22 upon folding of the web on the line 28 is to superimpose the portions of the pattern on the front and rear walls of the bag. Depending on the type of paper and the type of adhesive, it may or may not be necessary to apply the pattern to both walls. This is optional and within the skill of the art as to any particular situation. In either case, however, the front and rear walls of the final bag are securely glued together in the area of the pattern 22. The slits 51 applied by the cutter 50 are so related to the transverse cut 55 applied by the cutter 54 as to provide a clear pair of intersections 57 between the slits 51 and the transverse cut 55. This results in complete severance of the triangular areas 58 defined by the slits 51 and the transverse cut 55. The final bag 60 is shown in Fig. 3 and has a central opening 62 through which may pass the hook of a coat hanger. This particular bag is designed as a garment cover for use by laundries and cleaning establishments. Obviously other patterns and arrangements could be used to produce different forms of bags for various purposes, and some of these will be discussed in connection with certain of the alternative forms of this invention.

In Fig. 4 there is shown a bag machine frame 100, to the rear end of which is secured a vertical frame 102. A web 104 advances over tension rolls 106 and passes first between a pair of scoring rolls 108 and 110, supported on the brackets 112 on the vertical frame 102. The rolls 108 and 110 coact so as simultaneously to function both as backing rolls and scoring rolls. Rolls 108 are made up of two sets of rubber backing rings 114 and a pair of scoring knives 116. The roll 110 is made up of a pair of rubber backing rings 118 and two sets of scoring rings 120. The scoring rings 120 of the roll 110 bear against the rubber backing rings 114 of the roll 108, while the scoring rings 116 and the roll 108 bear against the rubber rings 118 of the roll 110. When the web 104 passes between rolls 110 and 108 it receives two sets of parallel score lines, each set comprising three lines. As will hereinafter be set forth in greater detail, the score lines thus formed define the gusset folds of the final tube.

The web 104 proceeds upwardly from the rolls 108 and 110 and passes between a backing roll 122 and a printing roll 124. The printing roll 124 receives liquid adhesive from a transfer roll 126, which rests in a vat of adhesive 128. The rolls 122, 124 and 126 and the vat 128 are supported in brackets 130 secured to the vertical frame 102. A doctor 132 is pivotally mounted at 134 on the brackets 130 and serves to regulate the quantity of adhesive supplied by the transfer roll 126 to the printing roll 124.

The printing roll 124 may be given any of a variety of printing surfaces, depending on the effect which it is ultimately desired to secure. The particular effect illustrated in Fig. 7 is made up of a horizontal, straight-line portion 136, with two pairs of hollow, triangular portions 138 having their bases spaced from the portion 136 and located in a specific relationship to the gusset score lines formed by rolls 110 and 108. This relationship will be discussed in connection with Fig. 15. The triangular portions 138 have their diagonals at 45 degrees the length of the bar 136.

The web 104 advances upwardly from the rolls 122 and 124 and passes over a backing roll 140, which is supported in brackets 142 secured to the vertical frame 102. A paste wheel 144 is mounted in an auxiliary frame 146, which is swingably mounted about a shaft 148, which shaft is driven by sprockets 150 from the shaft 152 of the backing roll 140. A transfer wheel 154 is keyed to the shaft 148 and bears against the paste wheel 144. A doctor 156 is secured to the auxiliary frame 146 and regulates the amount of paste supplied by the transfer wheel 154 to the paste wheel 144. The transfer wheel 154 receives paste from a vat 158, which is supported on a column 160, which column also supports the vat 128. A rack 162 is secured to the column 160 and meshes with a pinion 164, which is operated by a hand crank 168. By this means the vats 158 and 128 may simultaneously be lowered away from their associated transfer rolls for the purpose of cleaning or other servicing.

From the backing roll 140 the web 104 passes downwardly and goes under a pair of rollers 170. These rollers are keyed to a shaft 172, which shaft is journaled in a pair of members 174. Members 174 are pivotally mounted on a shaft 176. Upward rocking movement of the members 174 is limited by means of a set screw 178 secured in an extension 180 of one of the members 174. A sprocket 182 is keyed to shaft 172 and a sprocket 184 is keyed to the shaft 176, and the sprockets 182 and 184 are connected by a chain 186 whereby the shaft 176 positively drives the rollers 170.

The outermost surfaces of the rollers 170 are located to coincide with the innermost score lines produced by the rollers 108 and 110. The rollers 170, by conventional means not illustrated, are synchronized with the printing roll 124, and the adjustment is such that a notch 188 will always coincide with the pattern on the web 104 imprinted by the web 124. There is, therefore, no smearing of the paste applied by the roller 124 by any contact with the rolls 170. As the web 104 is placed under tension against the rolls 170, its margins fold along the innermost score lines applied by the rolls 108 and 110, and the web is thereby drawn into substantially a U-shape, with the front wall of the ultimate bag being defined between the outermost surfaces of the rolls 170. The U-shape is not so tightly drawn, however, as to produce contact between the printed side of the web and the end surface of the rolls 170.

From the rolls 170 the web 104 proceeds to the tubing unit, generally indicated by the numeral 200, and shown particularly in Figs. 4, 5, 8 and 9. The unit 200 is made up of externally converging passage 202 and an internal air duct 204. The inner surface of the passage 202 is made up of a set of foraminous walls 206 formed into a series of intersecting planes which conform to the front and rear walls and to the gussets to be formed in the tube. The foraminous walls are joined at their upper edges to plates 208 and at their lower edges to plates 210, to define chambers 212, which are constantly evacuated by means of a suitable pump. It will be clear that as the web 104 enters the passageway 202, defined by the walls 206, the foraminous surfaces will draw the web to conform to the section shown in Fig. 8, thus initiating the formation of the tube. A series of apertures 214 in the pressure duct 204 are directed toward the fold lines of the rear wall of the tube, while a similar series of apertures 216 are directed toward the fold lines of the front wall. These jets assist in bringing about conformation of the web 104 with the surfaces 206.

When the section illustrated in Fig. 9 is reached, formation of the tube is substantially complete, and it is only necessary at this section to preserve a small portion of foraminous surface 206 against the front wall of the tube. It will be noted in Fig. 5 that one margin 207 of one of the walls 206 terminates short of the equivalent margin 208 of the opposite wall 206. This permits the margins of the web to be brought into overlapped relation without any fouling of the unit 200 by the paste strip applied by the wheel 144.

As the collapsed tube emerges from the unit 200, it passes under a pair of rollers 220, the axes of which in conventional manner may be adjusted to lie at an angle to the center line of the tube, whereby to exert a drawing action tending to prevent separation of the central seam. The tube then passes between conventional draw rolls 222, which are power-driven and which operate to advance the tube and the web 104 through the various units heretofore described. The collapsed tube may then be severed into consecutive bag lengths, which may then pass through any suitable bottoming operation. The parts just described contemplate the formation of a square bag, in which one end of a gusseted tube length is folded transversely against and secured to the body of the tube. In such case the transverse paste bar 136 will lie at or slightly below the fold line of the bottom, while the triangular portions 138 will secure appropriate portions of the gussets to the adjacent portions of the front and rear walls and will serve to facilitate expansion of the bag.

There is illustrated in Fig. 4 a conventional thumb notch cutter 250 mounted on a driven shaft 252 and operating to produce the conventional thumb notch at the end of each tube length. The shaft 252 is synchronized with the rollers 170 and both are synchronized with the printing roller 124.

Depending on the nature of the web 104 and the speed at which it must pass through the unit 200, the evacuation of the chambers 212 may be dispensed with and reliance placed entirely on the jets 214 and 216, or the evacuation may be relied on entirely and the pressure member 204 dispensed with.

The prior art contains various suggestions for the placing of bodies of adhesive on the inner surface of a tube, but these relate to the application of a thermoplastic material which is hardened before the tube is formed and is then reactivated by heat and pressure after the tube is formed. So far as mouth closure is concerned, such treatment will continue to be valuable, since such closures are not reactivated until long after the bag is made; and this invention contemplates the application of suitable patterns of thermoplastic material to the web 104 before it reaches the machine illustrated in Figs. 4 and 5. There are, however, great advantages in the application of a wet adhesive, to be located in the bottom of the bag. A filling and closing machine is considered to have excellent production, in the neighborhood of 40 bags per minute, while rates of 200 bags per minute are not uncommon in the manufacture of bags. Obviously the latter rate allows far less time for devotion to the heat-sealing of the bottom. By providing a liquid paste bar which is still in substantially fluid condition when the tube is formed and collapsed, the adhesive flows into an optimum position completely to block the bottom of the bag, and such complete blocking takes place irrespective of the rate at which the bags are produced.

This invention has particular advantage and importance in the formation of impervious packages, where the interior surface of the tube is either lacquered or composed of a homogenous film. With such material on the interior of the tube, the percentage of defective packages will be greatly reduced through the avoidance of all rubbing action against the tube interior.

Figs. 10 through 14 illustrate a particular form of tuber adapted especially to the manufacture of large, multi-wall bags. A typical construction in this class is a bag having a face of 18", 2" gussets and a length of 30" formed, in an average case, from four plies of paper having basis weight of 40 or 50 pounds. In extreme cases there may be handled as many as 6 plies of paper having a basis weight of 60 pounds each. Such tubers operate at rather high web speeds, with the result that the frictional load involved in pulling the multiple webs around a former plate is very great. The present invention meets this problem, not only by eliminating of rubbing contact with the interior of the tube but also by substituting rolling instead of rubbing friction at all points in the tuber.

The machine is supported on a frame 300, the details of which are unimportant. At the rear there is a vertical frame 302 functionally similar to the frame 102 illustrated in Fig. 4. On this will be mounted a guide roll corresponding to the roll 106 of Fig. 4, scoring rolls corresponding to 108 and 110 of Fig. 4, and a paste printer corresponding to rolls 122 and 124 of Fig. 4. At the top, the super-imposed webs pass over a backing roll 304 corresponding to the roll 140 of Fig. 4. For the sake of simplicity, Fig. 11 has been drawn on the assumption that only three plies are involved. Obviously, any number of plies might be used. In multi-ply bag work the plies are mutually offset to expose at one side the inner surface of one margin of each ply. These are guided to move over the backing roll 304 and beneath three applicator rolls 306 which receive paste from a transfer roll 308. These margins are thus prepared to form the longitudinal seams.

The super-imposed webs pass downwardly from the backing roll 304 over a pair of forming rolls 310 similar to the rolls 170 in Fig. 4 and bearing a notch 312 similar to the notches 138 of the rolls 170. Because of the great length of the bags, usually only one notch 312 need be provided.

A series of table rolls 314 underlie the tuber and have their upper surfaces in a common plane with the lower surface of the roll 310. These prevent any tendency toward either longitudinal or transverse sagging of the webs which, in very large bags, would take place to a degree at least, irrespective of the tension applied by the feed rolls.

When the web passes over the rolls 310 it is drawn substantially into a U-shape with the outer axial surfaces of the rolls 310 defining the outer edges of the front wall of the tube. The webs have previously been scored to assist in defining the gussets. The upstanding portions of the U then pass between a first set of folding opposed rolls, of which the lowermost 316 engage the corners of the U. Intermediate rolls 318 engage the center line of the gussets and upper rolls 320 engage the outer edges of what will become the rear wall. Inside the U are tubes 322 which are supplied with compressed air and have perforations to direct air jets against the folding rolls 316 and 320, each of which is grooved around its periphery with the vertices of the grooves corresponding to the edges of the front and rear walls.

A number of sets of rolls are provided with their peripheries spaced and shaped to follow the tubing process as is probably best indicated in Figs. 12, 13 and 14 where for the sake of simplicity the progress of a single web 324 is indicated. The grooves in the peripheries of the upper and lower folding wheels become progressively deeper to accentuate the fold lines. The precise number of rolls is optional and will depend very largely on the total basis weight of the number of plies being used and on speed at which the webs are drawn through the machine. Generally speaking, the number of rolls should be increased as either basis weight or web speed increases, and in practice the number of sets will be chosen with regard to the maximum weight and speed contemplated. When the web has reached the condition illustrated in Fig. 14, the tube is virtually complete and it is completed by passing it between draw rolls 326, which not only act to advance the webs but to perfect the creasing of the gusset folds. There has thus been provided a tuber in which a multi-ply tube is formed in the complete absence of any rubbing friction.

Fig. 15 shows a web 300 in the condition in which it approaches the rolls 170 in Fig. 4. One set of gussets is defined by score lines 350 and the other set by score lines 352. Transverse bands of wet paste 354 are spaced at intervals corresponding to a bag length. After tubing, the web will be severed along lines 356 and the bottom will be folded along lines 358. Triangular areas of wet paste 360 are provided as shown. When the tube is formed and the adhesive has dried, these areas 360 greatly assist in opening and expanding the bottom of the bag to bring the bottom at right angles to the bag's axis. Care must be taken to assure that the apices of the areas 360 do not extend beyond the point to which the center of the gussets must "break" when the bag is expanding, and these areas 360 are therefore deliberately located to fall short of that point by an amount equal to the maximum expectable forward deviation between the paste printing station and the cutoff.

Figs. 16 and 17 illustrate a particular arrangement which may be best manufactured by the method and apparatus of Fig. 1, though it could be manufactured by the use of any of the other machines herein disclosed. In this case, a web 370 receives consecutive transverse bands of wet paste 372. Before the application of the wet paste, the web receives spaced bands 374 of thermoplastic material. These are preferably applied in the manner disclosed in U. S. Patent No. 2,237,327, and are fully hardened before the tubing operation starts. On the outside of the tube there are printed in distinctive colors bands of ink in registry with the bands of thermoplastic. The web is tubed preferably by the method and apparatus of Fig. 1 to the condition illustrated in Fig. 17. The cutoff occurs along lines 376 so that each bag length has a band 372 of wet adhesive at one end and three bands 374 of thermoplastic at the opposite end. The wet adhesive sets to block completely its end of the tube. The opposite end, after the contents (for example, a garment) is inserted, may be closed by heating and pressing the first of the three bands of thermoplastic. The bag is opened merely by severing one end thereof, the cutting operation being guided by the printed lines mentioned above. This makes available a second and third closure of the bag by activation of the second and third bands of adhesive. There is thus provided a storage bag sealed so tightly as to be completely proof against dust, moths, and other vermin and if desired it may also be made moisture-proof by selection of the proper material, and it may also be provided with a window.

Figs. 18 and 19 show a particular arrangement adapted to the formation of shipping sacks of the sewn type. Here a web 400 is scored to define a front wall 402, two halves of a rear wall 404, and a pair of gusset folds 406. At intervals there are applied to the web transverse strips of thermoplastic material. One of these 408, extends across the front wall 402 but terminates short of the gussets 406. A similar strip 410 also extends across the front wall and is spaced from the strip 408 by a distance a little less than the length of the ultimate bag. Similar strips 412 extend across the halves of the rear wall 404 and are in alignment with the strip 408. Strips 414 also extend across the rear wall 404 and are in alignment with the strip 410. All of these thermoplastic strips are fully hardened before the tubing operation. As the web 400 passes through the tubing process, it receives triangular paste patterns 416 and 418 in alignment with and joining the thermoplastic strips 408 and 410. Similar triangular areas 420 and 422 are placed between and join the thermoplastic strips 410. These triangular areas are tubed in wet condition and set after the tube has been fully formed and collapsed. It will be noted that the wet paste extends in complete alignment with strips 408 and 412 slightly beyond the base of the triangular areas so that when the bag is collapsed the inner surfaces of the walls will be firmly joined within the apices of the gussets in areas indicated at 424 in Fig. 19. Bags are severed along the line A—A in Fig. 18, leaving an untreated margin of the bag between each of the strips 408 and 410 and the end of the bag. The sewed closure is formed in this projecting area and the bag is then subjected to heat and pressure in the areas overlying the thermoplastic 408 and 412. The triangular areas 416 and 418 greatly assist in expanding both ends of the bag. The gussets are firmly held by these areas, and this is an enormous advantage where the front and rear walls are over 12 inches in width. At the bottom of the bag the strips 410 and 414 may be formed of wet paste and set solidly when the tube is collapsed on the tuber. The sewed seam should pass as close as possible to the transverse adhesive bands but should not penetrate these bands since this would so increase the heat developed by friction as seriously to impair the needle.

We claim:

1. A method of forming flattened tubular bag blanks comprising: advancing a continuous web of sheet material; applying to one side of said web a series of bodies of adhesive in fluid or tacky condition said bodies extending substantially the full width of the web; applying vacuum to the opposite side of said web in predetermined planes to guide said web into flattened tubular condition with said fluid or tacky adhesive bodies inside the tube; and severing consecutive bag blanks from said tube.

2. A method of making bags comprising: providing a roll of flexible material; drawing said material from said roll; advancing the material, and, by contact with one side only of said material, forming the same into a flattened tube during such advance the side contacted forming the exterior of the tube.

3. A method of making bags comprising: providing a roll of flexible material; drawing said material from said roll; advancing the material; printing bands of wet adhesive on one side of said web and extending substantially across the web and by contact with the unprinted side only of said material forming the same into a flattened tube during such advance, said flattening taking place while said adhesive is still wet and on the inside of the tube.

4. A method of making bags from continuous webs comprising: advancing a web; applying to one side of said web a series of bodies of thermoplastic material; applying to said web, adjacent to said thermoplastic bodies, a series of bodies of wet adhesive; hardening the thermoplastic bodies; forming the web into a tube with said bodies on the inside; flattening said tube before said wet adhesive has hardened; and severing bag lengths from said tube along lines lying between a body of thermoplastic and a body of wet adhesive whereby each bag length has a body of thermoplastic at one end and a body of wet adhesive at the other each of said bodies extending substantially across the web.

5. A tuber comprising: means defining a narrowing channel corresponding to the tube to be formed; means for advancing a continuous web through said channel-defining means, means for applying spaced, consecutive predetermined transverse bodies of liquid adhesive across that surface of said web which is to form the interior of the tube prior to its passage through said channel-defining means, and means for bringing said web into conformity with said channel-defining means whereby continuously to form said web into a tube, said advancing means operating at a speed sufficient to complete the tubing operation while said adhesive is still in liquid condition.

LEONARD R. HECKER.
MURRAY P. CLARK.

References Cited in the file of this patent

UNITED STATES PATENTS

| Number | Name | Date |
|---|---|---|
| 155,483 | Allison | Sept. 29, 1874 |
| 205,133 | Porter | June 18, 1878 |
| 329,561 | Noniss | Nov. 3, 1885 |
| 331,721 | Lorenz et al. | Dec. 1, 1885 |
| 331,723 | Lorenz et al. | Dec. 1, 1885 |
| 333,646 | Lorenz | Jan. 5, 1886 |
| 413,634 | Stilwell | Oct. 22, 1889 |
| 1,325,466 | Duvall | Dec. 16, 1919 |
| 1,551,924 | Arrouquier | Sept. 1, 1925 |
| 1,983,291 | Haskell | Dec. 4, 1934 |
| 2,012,357 | Shea | Aug. 27, 1935 |
| 2,054,486 | Sargent | Sept. 15, 1936 |
| 2,062,265 | Haskell | Nov. 24, 1936 |
| 2,265,075 | Knuetter | Dec. 2, 1941 |